United States Patent
Costabeber

(10) Patent No.: US 9,751,261 B2
(45) Date of Patent: Sep. 5, 2017

(54) STEREOLITHOGRAPHY MACHINE FOR PRODUCING A THREE-DIMENSIONAL OBJECT AND STEREOLITHOGRAPY METHOD APPLICABLE TO SAID MACHINE

(71) Applicant: DWS S.R.L., Thiene (VI) (IT)

(72) Inventor: Ettore Maurizio Costabeber, Thiene (IT)

(73) Assignee: DWS S.R.L., Thiene (IT)

( * ) Notice: Subject to any disclaimer, the term of this patent is extended or adjusted under 35 U.S.C. 154(b) by 0 days.

(21) Appl. No.: 15/284,208

(22) Filed: Oct. 3, 2016

(65) Prior Publication Data
US 2017/0021567 A1   Jan. 26, 2017

Related U.S. Application Data

(62) Division of application No. 14/522,728, filed on Oct. 24, 2014, now Pat. No. 9,457,516, which is a division (Continued)

(30) Foreign Application Priority Data

Apr. 20, 2011   (IT) ............................... V12011A0099

(51) Int. Cl.
    *B29C 67/00*    (2017.01)
    *B33Y 30/00*    (2015.01)
    *B33Y 10/00*    (2015.01)

(52) U.S. Cl.
CPC ...... *B29C 67/0085* (2013.01); *B29C 67/0055* (2013.01); *B29C 67/0062* (2013.01);
(Continued)

(58) Field of Classification Search
CPC . B29C 67/0085; B29C 67/0066; B33Y 30/00; B33Y 10/00
(Continued)

(56) References Cited

U.S. PATENT DOCUMENTS 5,059,359 A    10/1991  Hull et al.
5,238,614 A    8/1993  Uchinono et al.
(Continued)

FOREIGN PATENT DOCUMENTS

EP    0 597 114 A1    5/1994
JP    H071594    1/1995
(Continued)

OTHER PUBLICATIONS

International Search Report from corresponding WO patent application PCT/IB2012/000775, dated Jul. 25, 2012.

*Primary Examiner* — Nahida Sultana
(74) *Attorney, Agent, or Firm* — Husch Blackwell LLP

(57) ABSTRACT

The invention is a stereolithography machine (1) comprising: a container (2) suited to contain a fluid substance (3) suited to solidify through exposure to predefined radiation (4a); means (4) suited to emit the predefined radiation (4a) and to solidify a layer of the fluid substance (3) having a predefined thickness and arranged adjacent to the bottom (2a) of the container (2); a modelling plate (5) suited to support the solidified layer (6); actuator means (7) suited to move the modelling plate (5) according to a direction perpendicular to the bottom (2a) of the container (2); levelling means (8) arranged in contact with the fluid substance (3), associated with power means suited to move them with respect to the container (2) so as to redistribute the fluid substance (3) in the container (2). The power means are configured so as to move the container (2) in each one or the two opposite senses of a direction of movement (Y) and the levelling means (8) comprise two paddles (9, 10) that are opposite each other with respect to the modelling plate (5).

9 Claims, 3 Drawing Sheets

Figure 1:
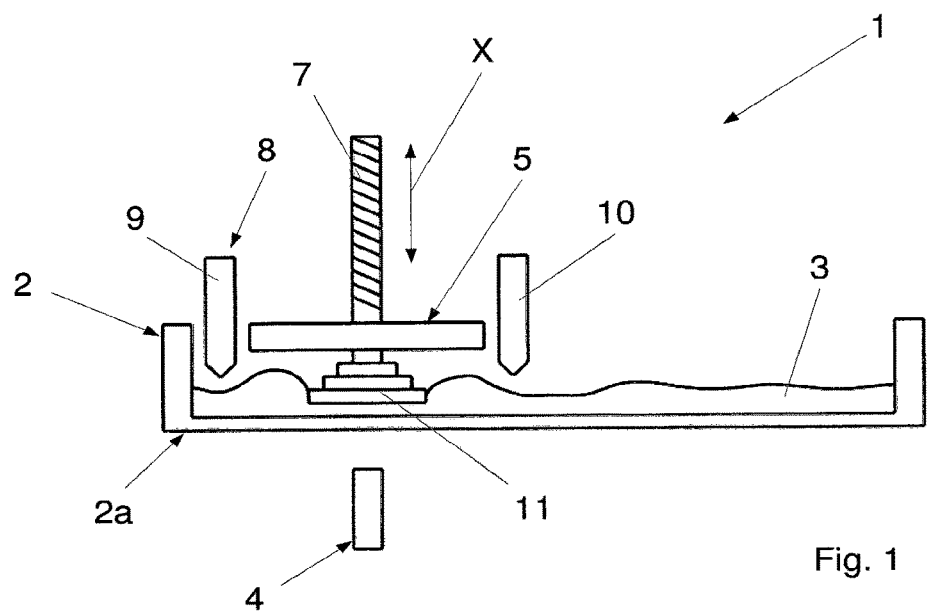

Related U.S. Application Data of application No. 14/001,960, filed as application No. PCT/IB2012/000775 on Apr. 19, 2012, now Pat. No. 8,894,400.

(52) U.S. Cl.
CPC .......... B29C 67/0066 (2013.01); B33Y 10/00 (2014.12); B33Y 30/00 (2014.12)

(58) Field of Classification Search
USPC ........................ 264/308, 401; 425/375, 174.4
See application file for complete search history.

(56) References Cited

U.S. PATENT DOCUMENTS

| | | | |
|---|---|---|---|
| 5,447,822 A | 9/1995 | Hull et al. | |
| 5,573,721 A | 11/1996 | Gillette | |
| 5,876,550 A * | 3/1999 | Feygin | B22C 9/00 |
| | | | 156/256 |
| 6,627,376 B1 | 9/2003 | Ueno | |
| 6,764,636 B1 | 7/2004 | Allanic et al. | |
| 6,799,959 B1 | 10/2004 | Tochimoto et al. | |
| 7,459,111 B2 | 12/2008 | Miyakawa et al. | |
| 7,713,048 B2 | 5/2010 | Perret et al. | |
| 7,850,885 B2 | 12/2010 | Philippi et al. | |
| 7,879,393 B2 | 2/2011 | Ederer et al. | |
| 7,931,462 B2 | 4/2011 | Mattes | |
| 8,070,474 B2 | 12/2011 | Abe et al. | |
| 8,083,513 B2 | 12/2011 | Montero-Escuder et al. | |
| 8,469,692 B2 | 6/2013 | Kritchman et al. | |
| 8,894,400 B2 | 11/2014 | Costabeber | |
| 2007/0057412 A1* | 3/2007 | Weiskopf | B29C 67/0077 |
| | | | 264/497 |
| 2007/0074659 A1 | 4/2007 | Wahlstrom | |
| 2007/0075461 A1 | 4/2007 | Hunter et al. | |
| 2008/0203621 A1 | 8/2008 | Mattes | |
| 2009/0045553 A1 | 2/2009 | Weidinger et al. | |
| 2009/0068376 A1 | 3/2009 | Philippi et al. | |
| 2009/0196946 A1* | 8/2009 | Kihara | B29C 67/0066 |
| | | | 425/171 |
| 2010/0095467 A1 | 4/2010 | Kravitch | |
| 2011/0255898 A1 | 10/2011 | Kashiide et al. | |
| 2011/0310370 A1 | 12/2011 | Rohner et al. | |
| 2012/0195994 A1 | 8/2012 | El-Siblani et al. | |
| 2014/0175708 A1 | 6/2014 | Echigo et al. | |
| 2015/0224710 A1* | 8/2015 | El-Siblani | B33Y 70/00 |
| | | | 264/401 |
| 2015/0302188 A1 | 10/2015 | Potbhare et al. | |

FOREIGN PATENT DOCUMENTS

| | | |
|---|---|---|
| JP | 2000094528 | 4/2000 |
| JP | 2010259804 | 11/2010 |
| JP | 2012505773 | 3/2012 |
| JP | 2012505774 | 3/2012 |

* cited by examiner

STEREOLITHOGRAPHY MACHINE FOR PRODUCING A THREE-DIMENSIONAL OBJECT AND STEREOLITHOGRAPY METHOD APPLICABLE TO SAID MACHINE

DESCRIPTION

This Application is a divisional application of U.S. patent application Ser. No. 14/522,728 filed on Oct. 24, 2014 (issuing on Oct. 4, 2016 as U.S. Pat. No. 9,457,516), which is a divisional of U.S. patent application. Ser. No. 14/001,960, filed on Aug. 28, 2013 which issued as U.S. Pat. No. 8,894,400 on Nov. 25, 2014, which is a national phase filing under 35 USC §371 of International Application No. PCT/IB12/00774 of Apr. 19, 2012, which claims priority from Italian Patent Application No. V12011A000099 filed Apr. 20, 2011.

The present invention concerns a stereolithography machine and a stereolithography method applicable to said stereolithography machine.

As is known, the stereolithography technique is used to produce three-dimensional objects through the successive deposition of several layers of a light-sensitive liquid resin capable of polymerizing through exposure to a light source.

In particular, each resin layer is superimposed to the preceding layer of the three-dimensional object to be produced and is allowed to selectively solidify in the points corresponding to the volume of the object itself.

A stereolithography machine according to a known embodiment comprises a container suited to contain said liquid resin and provided with a transparent bottom.

There is also a light source, generally a laser emitter or a projector, capable of selectively irradiating the layer of liquid resin arranged adjacent to the bottom of the container so that it solidifies.

The machine comprises also a modelling plate suited to support the solidified layers of the three-dimensional object, associated with actuator means suited to provide for moving the plate in a direction perpendicular to the bottom of the container.

According to a stereolithography method of the known type using the above mentioned machine, first of all the modelling plate is arranged at a distance from the bottom of the container that is equal to the thickness of the layer to be solidified.

Successively, the liquid resin layer adjacent to the bottom of the container is selectively irradiated by means of the light source in order to solidify it.

The modelling plate is configured so that the solidified layer adheres to it while, in the contrary, the bottom of the container is provided with a covering that reduces such adhesion.

The modelling plate is successively moved away from the bottom of the container, so as to make the solidified layer emerge from the liquid resin and thus make it possible to restore the thickness of the liquid resin that is necessary for processing a successive layer of the object.

In fact, lifting the modelling plate and the solidified layer means leaving a depression in the liquid resin, which is filled by the spontaneous flow of the resin itself.

Said levelling action restores the thickness of the liquid resin that is necessary to solidify a new layer of the object and furthermore prevents air bubbles from remaining trapped into the liquid resin during the successive lowering of the modelling plate, which may affect the integrity of the successive layer of the three-dimensional object.

Once said spontaneous levelling is completed, the modelling plate is immersed again in the liquid resin and a further layer of the object is solidified.

The method described above poses the drawback that the overall processing time of the three-dimensional object is considerably prolonged due to the waiting time needed after the solidification of each layer of the object for the liquid resin to level out.

Since the number of layers that form an object obtained through stereolithography can reach several hundreds, it can be understood that the waiting times mentioned above result in a considerable increase in the processing time.

Obviously, the waiting times are proportional to the viscosity of the liquid resin. Therefore, the drawback mentioned above is particularly important when resins of the so-called "hybrid" type are used, which comprise particles in ceramic or other materials mixed with the polymeric component.

Said hybrid resins are suitable for producing objects with high mechanical resistance but on the other hand their viscosity is much higher compared to the other resins commonly used in stereolithography.

In a known embodiment, described in the Patent application WO 2010/045950, the stereolithography machine includes a circular revolving tank and a fixed levelling paddle arranged in contact with the resin, developing radially with respect to the tank.

Before the solidification of each layer, the tank is rotated so that the levelling paddle fills the depression left by the modelling plate when it is lifted.

This embodiment poses the drawback that the diameter of the tank is at least twice the length of the paddle and therefore occupies a considerably larger space compared to the minimum surface required for modelling.

The present invention intends to overcome all the drawbacks of the known art as outlined above.

In particular, it is the object of the present invention to provide a stereolithography method and a stereolithography machine that make it possible to produce a three-dimensional object through the solidification of a fluid substance in layers, more rapidly than when employing the method of the known type described above.

It is a further object of the invention to limit the overall dimensions of the machine compared to the machines of the known type.

The above mentioned objects are achieved by a stereolithography machine for producing a three-dimensional object in layers according to claim 1.

The objects described above are also achieved by a stereolithography method suited to be applied to the stereolithography machine as described above, according to claim 3.

Further characteristics and details of the invention are described in the corresponding dependent claims.

Advantageously, the method and the machine that are the subjects of the invention make it possible to produce a three-dimensional object in an overall time that is substantially independent of the viscosity of the fluid substance used.

Therefore, to advantage, the invention is particularly suited to be used with highly viscous liquid substances like, for example, the hybrid resins mentioned above, or with fluid pasty substances whose viscosity is even higher.

Still advantageously, the reduced overall dimensions make it possible to use the machine in smaller spaces.

The said objects and advantages, together with others which will be highlighted below, are illustrated in the description of some preferred embodiments of the invention which are provided by way of non-limiting examples with reference to the attached drawings, wherein:

FIGS. from 1 to 6 show schematic side views of the stereolithography machine of the invention, in different operating configurations.

The method of the invention is described with reference to a stereolithography machine indicated as a whole by 1 in FIG. 1, which comprises a container 2 containing a fluid substance 3 suited to be solidified through exposure to predefined radiation 4a.

It is specified since now that the term "fluid substance" means a substance suited to be distributed in the container 2 so that its surfaces assumes a substantially flat shape, for example like that of a liquid or pasty substance.

The fluid substance 3 is preferably but not necessarily a light-sensitive polymeric liquid resin and the predefined radiation is light radiation.

In particular, said resin is of the so-called "hybrid" type, comprising particles in ceramic or other materials that are capable of increasing the mechanical resistance of the resin once it has solidified.

However, the method and the machine of the invention may be used with a fluid substance of any type, provided that it is able to solidify following exposure to predefined radiation.

The machine 1 also comprises means 4 suited to emit the predefined radiation 4a, capable of selectively irradiating a layer of the fluid substance 3 having a predefined thickness and arranged adjacent to the bottom 2a of the container is 2 so as to solidify it.

Figure 2:
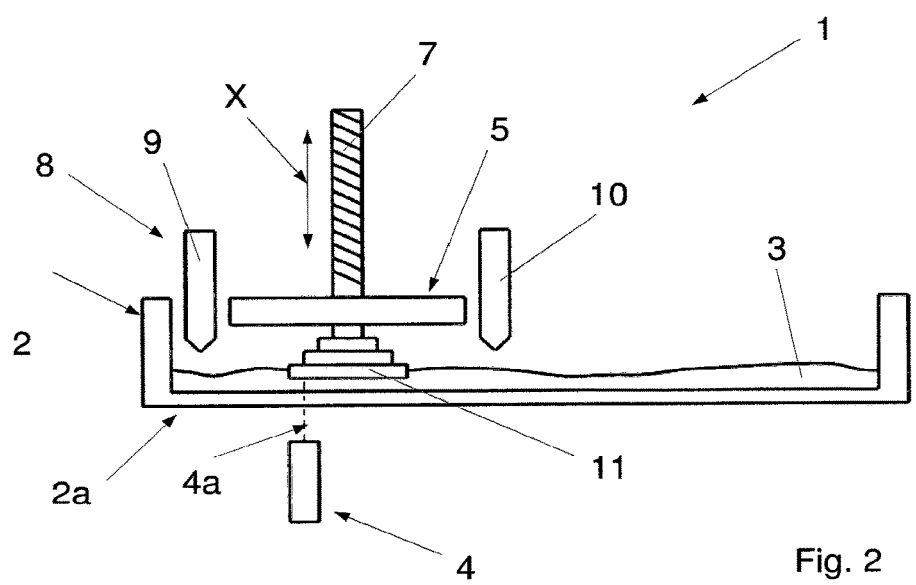

The emitter means 4 are preferably arranged under the container 2 and are configured so as to direct the predefined radiation 4a towards the bottom 2a of the container 2, which is transparent to radiation, as shown in FIG. 2.

Preferably, if the fluid substance 3 is a light-sensitive resin, the emitter means 4 comprise a laser light emitter associated with means suited to direct the light beam towards any point of the above mentioned layer of the fluid substance 3.

According to a variant embodiment of the invention, not illustrated herein, the emitter means 4 comprise a projector suited to generate a luminous image corresponding to the surface area of the layer of fluid substance 3 to be solidified.

The stereolithography machine 1 also comprises a modelling plate 5 facing the bottom 2a of the container 2 and suited to support the three-dimensional object 11 being formed.

The modelling plate 5 is associated with actuator means 7 suited to move it with respect to the bottom 2a according to a modelling direction X that is perpendicular to the same bottom 2a.

In particular, the modelling plate 5 is configured in such a way that the fluid substance 3 adheres to it once it has solidified.

On the contrary, the bottom 2a of the container 2 is preferably made of a material that prevents said adhesion.

According to the method of the invention, the modelling plate 5 is immersed in the fluid substance 3 until arranging it at a distance from the bottom 2a that is equal to the thickness of the solidified layer to be obtained.

Figure 3:
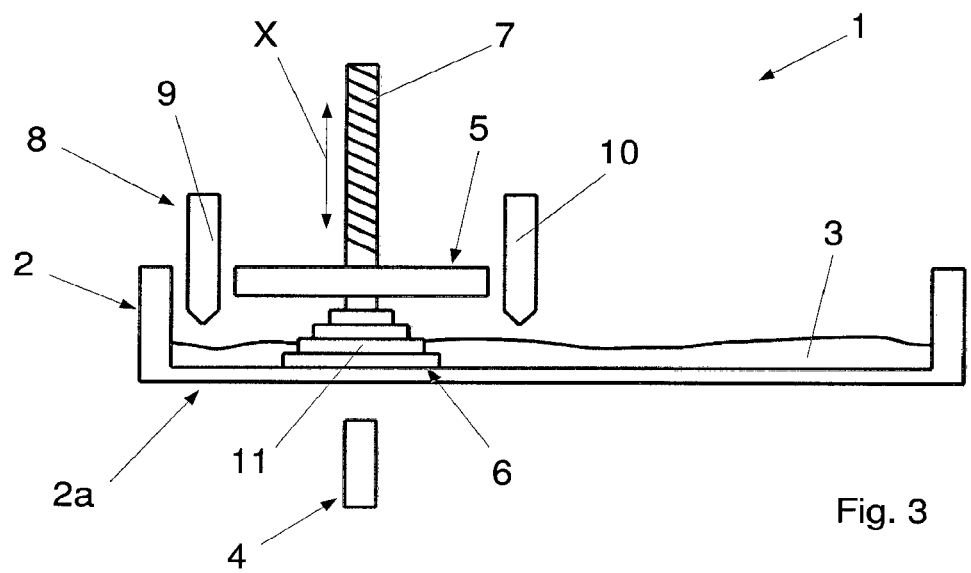

The layer of the fluid substance 3 is then selectively irradiated in order to obtain the solidified layer 6, which adheres to the modelling plate 5, as shown in FIGS. 2 and 3.

Figure 4:
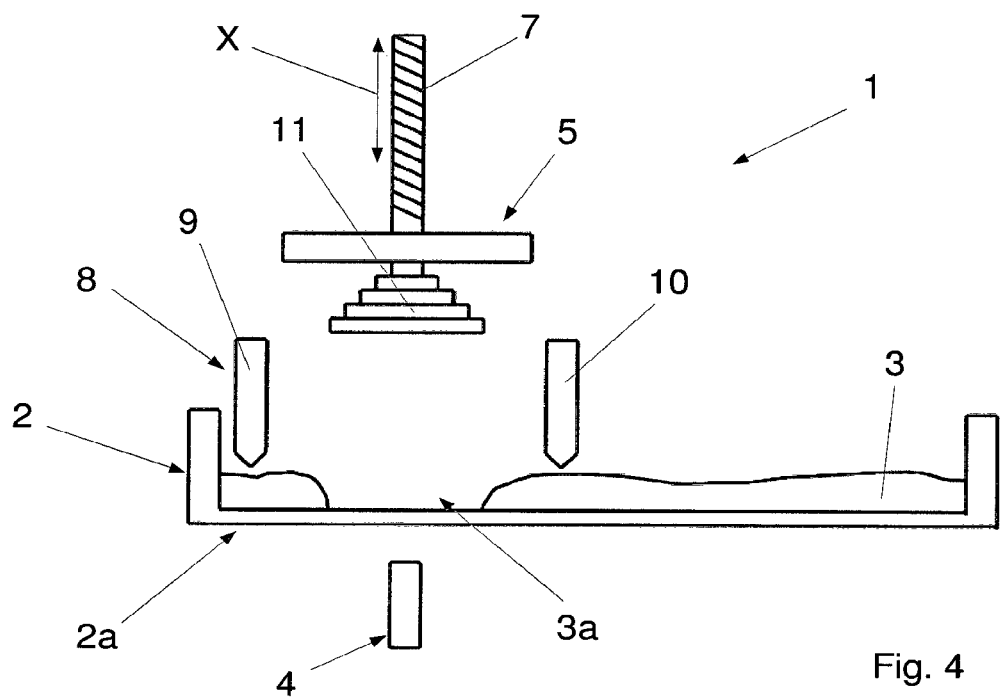

Successively, the modelling plate 5 is lifted in such a way as to move the solidified layer 6 away from the bottom 2a until it emerges from the fluid substance 3, as shown in FIG. 4.

Following the above mentioned movement of the solidified layer 6 away from the bottom 2a, in the fluid substance 3 contained in the container 2 there still is a depressed area 3a at the level of the position previously occupied by the modelling plate 5 and/or by the three-dimensional object 11 being formed.

According to the method of the invention, to fill the above mentioned depression 3a, the fluid substance 3 is redistributed in the container 2 by pushing the fluid substance 3 towards the depression 3a through levelling means 8 arranged in contact with the fluid substance 3.

In particular, said levelling means 8 are associated with power means, not shown herein but known per se, configured so as to move them with respect to the bottom 2a of the container 2 in contact with the fluid substance 3, so as to redistribute the latter as described above.

Successively, the modelling plate 5 is lowered again and the operations described above are repeated in order to obtain the solidification of a further layer of the object 11.

It can be understood that the above mentioned levelling means 8 make it possible to fill the depression 3a in a much quicker way compared to the known method previously described, in which the filling action is due to the spontaneous redistribution of the fluid substance.

Therefore, the waiting time for the levelling of the fluid substance 3 after the solidification of each layer of the object is considerably reduced, thus reaching the aim to reduce the overall processing time compared to the time required by the methods of the known type.

In particular, the higher the viscosity of the fluid substance 3 used, the shorter the overall processing time.

Therefore, the method of the invention is particularly suited to be used when the fluid substance 3 is a hybrid resin with high viscosity, as previously explained.

Preferably, the levelling means 8 are placed in contact with the surface of the fluid substance 3 in an area where the level is higher than the level of the fluid substance 3 at the height of the depression 3a, so as to be able to push the fluid substance 3 towards the depression 3a.

Furthermore, the container 2 can be moved in a direction of movement Y with respect to the modelling plate 5.

The levelling means 8 comprise two paddles 9, 10 arranged on opposite sides with respect to the modelling plate 5 and mainly developed according to a longitudinal direction perpendicular to said direction of movement Y.

Preferably, the length of the paddles 9, 10 corresponds to the width of the container 2.

In the figures, the paddles 9 and 10 are shown in a side view and therefore is their longitudinal direction is perpendicular to the plane of the figures themselves.

Obviously, the paddles 9, 10 can have any shape, even different from that shown in the figures, provided that they are suited to come into contact with the surface of the fluid substance 3 contained in the container 2 in order to level it.

Figure 5:
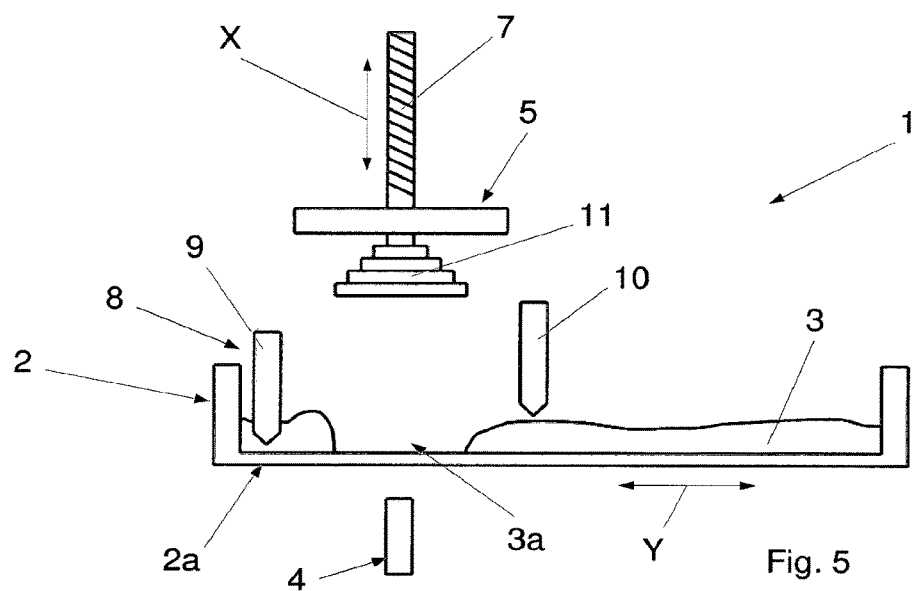
Figure 6:
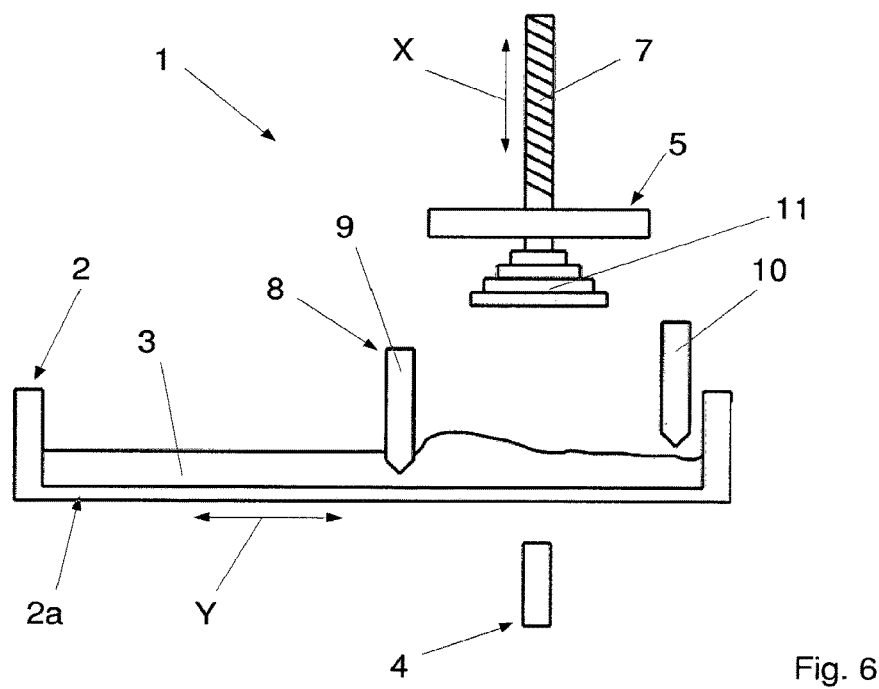

The redistribution of the fluid substance 3 is carried out by maintaining the paddles 9, 10 fixed and moving the container 2 in said direction of movement Y, as shown in FIGS. 5 and 6.

In this way, the paddle that is arranged upstream of the depression 3a with respect to the direction of movement pushes the fluid substance 3 in the depression, thus filling the latter, as shown in FIG. 6.

Advantageously, the presence of two paddles 9 and 10 makes it possible to redistribute the fluid substance 3 in any one of the two directions of movement of the container 2, thus avoiding the need to bring the container 2 back to its initial position before solidifying each layer.

More precisely, after the solidification of a layer, the container 2 is moved so that the area in which there is the depression 3a, visible in FIG. 5, is displaced with respect to the modelling plate 5, thus aligning with the latter a different area of the container 2, not affected by the depression 3a, as shown in FIG. 6.

The solidification of the successive layer can thus take place at the level of this new area of the container 2.

At the same time, during the movement of the container 2, the depression 3a is filled so that the previous area can be used in the successive solidification of a further layer.

Obviously, the possibility to redistribute the fluid substance 3 at the same time as the container 2 is moved in each one of two opposite senses makes it possible to use a container 2 whose surface area is smaller compared to that of the circular container used in the known art.

In fact, the container 2 can have a rectangular shape whose length, according to the direction of movement Y, is equal to approximately twice the minimum dimension required for modelling, and whose width is approximately equal to said minimum dimension.

On the contrary, in the machines of the known type using a circular tank, the minimum diameter of the container must be equal to approximately twice said minimum dimension.

Preferably, the power means of the paddles 9 and 10 are configured so that each paddle can be immersed in the fluid substance 3 and extracted from it independently of the other paddle.

In this way, to advantage, the redistribution of the fluid substance 3 can be carried out using only the paddle that, with respect to the modelling plate 5, is arranged downstream according to the direction of movement Y of the container 2 or, in other words, upstream of the depression 3a.

In this way, the other paddle is prevented from pushing the fluid substance 3 away from the depression 3a and the redistribution process is facilitated.

The above clearly shows that the invention achieves all the set objects.

In particular, the use of levelling means to fill the depression present in the fluid substance after the solidification of each layer of the object makes it possible to reduce the waiting time before the solidification of the successive layer.

Consequently, the overall time necessary to make the three-dimensional object is considerably reduced compared to the time needed when using the stereolithography methods of the known type, and said time reduction becomes larger as the viscosity of the fluid substance used increases.

Furthermore, the presence of two paddles arranged on corresponding opposite sides of the modelling plate makes it possible to level the fluid substance through an alternating motion of the container in two opposite senses, thus avoiding the need to use a circular container which is rather bulky.

The method and the machine that are the subjects of the invention may be subjected to further changes that, even though not described herein and not illustrated in the drawings, must all be considered protected by the present patent, provided that they fall within the scope of the following claims.

Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claimed is:

1. A method for producing a three-dimensional object in layers within a stereolithography machine comprising:
    movably mounting a container containing a fluid substance in a liquid or a paste state that is solidified through exposure to predefined radiation, the container being mounted so that it can be moved in each one of two mutually opposite horizontal directions, the container having a bottom which is transparent to the predefined radiation;
    a first operation of selectively irradiating a first one of said layers of a fluid substance through the transparent bottom of the container containing the fluid substance in such a way as to obtain a corresponding one of said solidified layers;
    a second operation of moving said solidified layer away from said bottom to make it emerge from said fluid substance;
    a third operation of redistributing said fluid substance in said container in such a way as to fill a depression in said fluid substance caused by said second operation;
    repeating the first, second and third operations for a second one of said layers;
    wherein said third operations comprise:
    performing a movement of said container in one of said two mutually opposite horizontal directions after one of said second operations and performing a movement of said container in the opposite horizontal direction after another one of said second operations, and
    during each one of said movements of the container in a horizontal direction, arranging a leveler to be in contact with said fluid substance on a side of a modeling plate so that movement of the container in a direction where the depression moves toward the leveler causes the leveler to move the fluid substance into the depression.

2. The method according to claim 1 wherein said arranging of a leveler includes providing first and a second levelers for use during said two horizontal movements, and
    wherein the method includes maintaining the second leveler raised from said fluid substance when the first leveler is in contact with the fluid substance during movement of the container in one of the horizontal directions, and
    maintaining the first leveler raised from said fluid substance when the second leveler is in contact with the fluid substance during movement of the container in the opposite horizontal direction.

3. A method for producing a three-dimensional object in layers within a stereolithography machine comprising:
    movably mounting a container containing a fluid substance in a liquid or a paste state that is solidified through exposure to predefined radiation, the container being mounted so that it can be moved in each one of two mutually opposite horizontal directions, the container having a bottom which is transparent to the predefined radiation;
    a first operation of selectively irradiating a first one of said layers of a fluid substance through the transparent bottom of the container containing the fluid substance in such a way as to obtain a corresponding one of said solidified layers;
    a second operation of moving said solidified layer away from said bottom to make it emerge from said fluid substance;

a third operation of redistributing said fluid substance in said container in such a way as to fill a depression in said fluid substance caused by said second operation;

providing two paddles extending in a longitudinal direction perpendicular to said horizontal directions of movement, wherein the two paddles are positioned on two corresponding opposite sides of said modeling plate with respect to said horizontal directions;

repeating the first, second and third operations for a second one of said layers;

wherein successive ones of said third operations comprise performing two movements of said container, one movement in each of said two opposite horizontal directions; and during one of said two successive horizontal movements of the container, positioning one of the two paddles to engage the fluid substance so that movement of the container moves the depression toward the one paddle and causes the one paddle to move the fluid substance into the depression, and positioning the other paddle on the other horizontal side of the modeling plate so that the other paddle is raised from said fluid substance.

4. A method for producing a three-dimensional object in layers within a stereolithography machine having a container containing a fluid substance that solidifies through exposure to predefined radiation, the container being mounted for reciprocal horizontal movement, the container having a bottom which is transparent to the predefined radiation, the machine including a modeling plate to which the three-dimensional object will be attached, the method comprising the steps of:

in a first operation, obtaining a solidified layer by selectively irradiating a fluid substance through the transparent bottom of the container containing the fluid substance; then in a second operation, moving the modeling plate relative to the container to move the solidified layer away from the fluid substance; then in a third operation, redistributing the fluid substance to fill a depression in said fluid substance caused by the second operation, the third operation including providing two paddles extending in a longitudinal direction perpendicular to the horizontal direction of movement of the container, the paddles being located on opposite sides of the modeling plate, the third operation including causing one of the paddles to be positioned in the fluid substance when moving the container horizontally after the second operation so that the paddle in the fluid substance redistributes the fluid substance into the depression as the container moves the depression under the paddle; and reiterating the first, second, and third operations to develop successive layers of the object, including alternating the direction of horizontal movement of the container and which of the paddles is positioned in the fluid substance to cause redistributing of the fluid substance between at least two successive third operations.

5. The method of claim 4 including, when the next movement of the container will be to the left, relative to the modeling plate, the paddle to the left of the modeling plate is positioned in the fluid substance so that as the container is moved to the left, the left paddle redistributes the fluid substance into the depression;

the method further including, when the next movement of the container is to the right, relative to the modeling plate, the paddle to the right of the modeling plate is positioned in the fluid substance so that as the container is moved to the right, the right paddle redistributes the fluid substance into the depression.

6. The method of claim 5 wherein when one paddle is positioned in the fluid substance and the container is moving, the other paddle is positioned so that it does not redistribute the fluid substance.

7. A method for producing a three-dimensional object in layers within a stereolithography machine having a container containing a fluid substance that solidifies through exposure to predefined radiation, the container being mounted for reciprocal horizontal movement, the container having a bottom which is transparent to the predefined radiation, the machine including a modeling plate to which the three-dimensional object will be attached, the method comprising the steps of:

forming a layer of the object;

moving the container to the left while a paddle located to the left of the modeling plate is positioned in the fluid substance to cause redistribution of the fluid substance into a depression in the fluid substance resulting from withdrawing the object being formed from the fluid substance; and moving the container to the right while a paddle located to the right of the modeling plate is positioned in the fluid substance to cause redistribution of the fluid substance.

8. A method of producing a three-dimensional object in layers within a stereolithography machine having a container containing a fluid substance that solidifies through exposure to predefined radiation, the stereolithography machine including a modeling plate to which the three-dimensional object will be attached, the method comprising the steps of:

forming a layer of the object by selectively radiating a fluid substance that is within the container, elevating the layer from the fluid substance, and moving the container in a horizontal direction;

after said forming step, operating a leveler arrangement so that when the container moves in a horizontal direction, the leveler arrangement moves some of the fluid substance in an opposite horizontal direction with respect to the container;

reiterating said steps to form successive layers of the object; and wherein the method includes moving the container in reciprocating horizontal directions.

9. The method of claim 8 wherein the step of operating a leveler arrangement includes operating first and second paddles so that the first paddle engages the fluid substance when the container moves in a first horizontal direction but the second paddle does not; and the second paddle engages the fluid substance when the container moves in a second horizontal direction but the first paddle does not.

* * * * *